No. 837,188. PATENTED NOV. 27, 1906.
A. B. CADMAN.
DRIVE GEARING FOR AUTOMOBILE SPEED INDICATING MECHANISMS.
APPLICATION FILED JUNE 25, 1906.
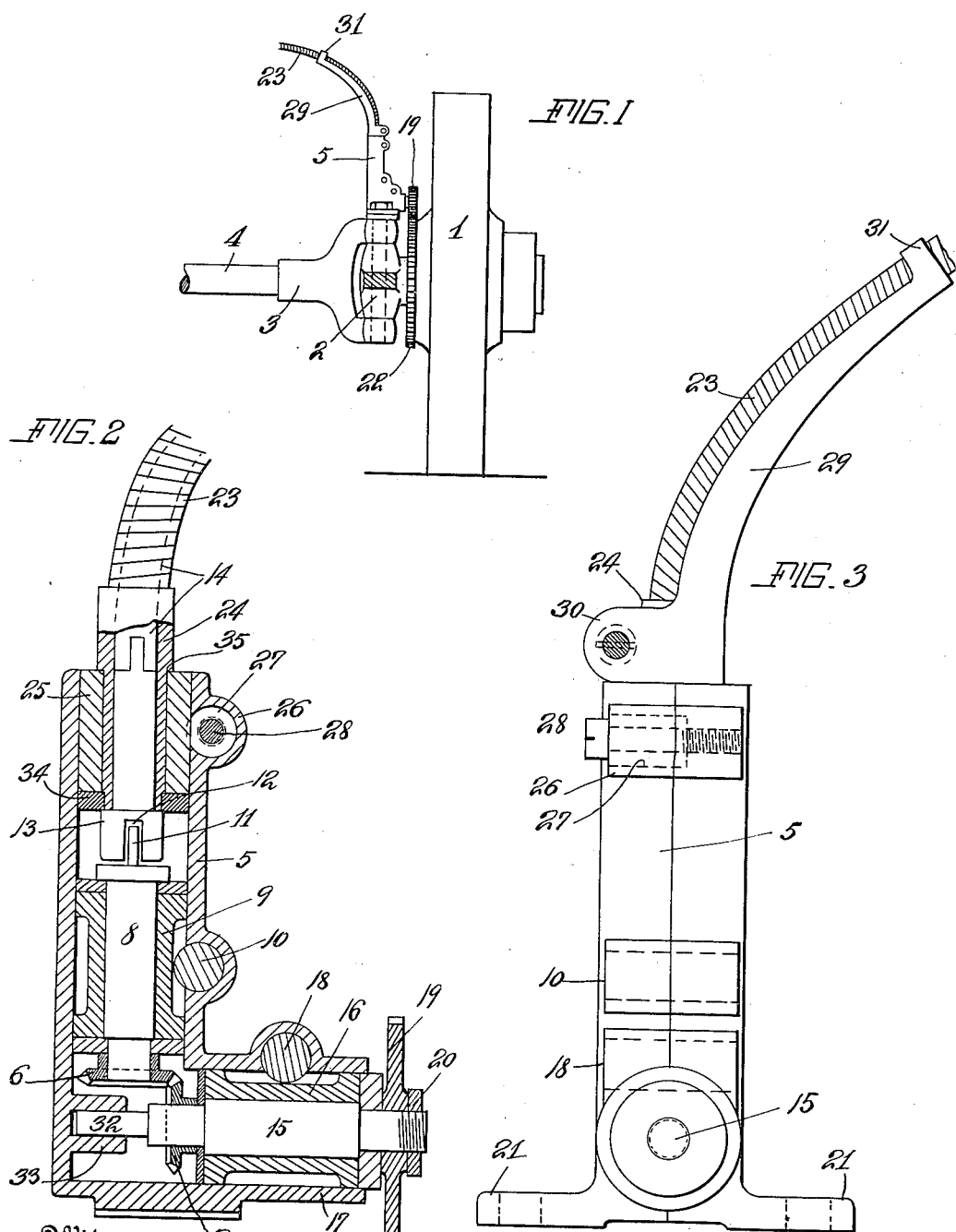

UNITED STATES PATENT OFFICE.

ADDI BENJAMIN CADMAN, OF BELOIT, WISCONSIN, ASSIGNOR TO WARNER INSTRUMENT COMPANY, OF BELOIT, WISCONSIN, A CORPORATION OF WISCONSIN.

DRIVE-GEARING FOR AUTOMOBILE SPEED-INDICATING MECHANISMS.

No. 837,188.　　　Specification of Letters Patent.　　Patented Nov. 27, 1906.

Application filed June 25, 1906. Serial No. 323,414.

*To all whom it may concern:*

Be it known that I, ADDI BENJAMIN CADMAN, a citizen of the United States, residing at Beloit, in the county of Rock and State of Wisconsin, have made a certain new and useful Invention in Drive-Gearing for Automobile Speed-Indicating Mechanisms, of which the following is a specification.

This invention relates to drive-gearing for automobile speed-indicating mechanism.

The object of the invention is to provide a drive-gearing for automobile speed-indicating mechanism which is simple in construction, economical in manufacture, and efficient in operation.

A further object is to provide a gearing of the character referred to adapted to be mounted upon the steering-knuckle and wherein the bending or twisting of the shaft which transmits the motion from the wheel to the speed-indicating mechanism is avoided when the steering-knuckle is rocked to steer the automobile.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in elevation showing the front wheel of an automobile and the steering-knuckle upon which the wheel is journaled and showing the application of a drive-gearing embodying the principles of my invention. Fig. 2 is a broken view in central longitudinal section of the drive-gearing and its casing. Fig. 3 is a broken view in elevation of the same.

The same part is designated by the same reference-sign wherever it occurs throughout the several views.

In operating speed-measuring devices for automobiles or other vehicles it is a customary expedient to mount the measuring or indicating mechanism upon the body of the vehicle or automobile and in convenient position to be readily inspected or examined and to drive the same by means of a flexible or other shaft or gearing from driving mechanism operated from a suitable or convenient rotating part of the vehicle. The best results are attained by driving the speed-measuring or indicating instrument from a front or steering wheel of the automobile or vehicle, for the reason that such wheel ordinarily is not a power-driven wheel, and hence inaccuracy of the measuring instrument through slippage of a driven wheel is reduced to the minimum.

In practice and in accordance with the principles of my invention I propose to mount the measuring instrument upon a convenient part of the body of the car or vehicle, and preferably, though in this respect I do not desire to be limited or restricted, upon the dashboard in convenient position to be readily examined or inspected by the driver or occupant of the car or vehicle, and I propose to mount the drive-gearing for the instrument upon the steering-knuckle of the front wheel and to transmit the motion of such gearing to the instrument through a flexible or other shaft or other form of transmitting-gearing. By mounting the drive-gearing upon the steering-knuckle of the front wheel I am enabled to maintain proper driving mesh of the gears, through which the rotations of the wheel are transmitted to the drive-gearing, notwithstanding the rocking and swinging movements of the steering-knuckle in the steering of the motor car or vehicle. With the drive-gearing mounted upon the steering-knuckle, however, it is obvious that during the rocking movements of the knuckle to steer the car or vehicle the transmitting mechanism intermediate the drive-gear and the instrument is liable to be twisted or bent or the protecting-sheathing therefor chafed or rubbed.

It is among the special purposes of my present invention to provide a drive-gearing of such construction and arrangement as to enable the steering-knuckle to be rocked or swung in steering the car without imparting to the transmitting-shaft a twist or turn or without subjecting the protecting-sheathing therefor to undue rubbing chafing, or wear, thereby avoiding any possibility of inaccuracy in the reading of the instrument through the bending or twisting of its driving-shaft and also avoiding rapid wear upon the protecting-sheathing of such shaft. Many specifically different constructions and arrangements embodying this idea may readily suggest themselves to persons skilled in the art. While, therefore, I have shown and will now describe one construction which I have found efficient in operation and which embodies the principles of operation involved, I do not desire to be limited or restricted thereto.

Referring to the accompanying drawings, reference-sign 1 designates the front wheel of an automobile, said wheel being journaled upon a stub-axle carried by a steering-knuckle 2, pivoted to rock or swing in a head 3, carried by the front axle 4 of the automobile. These parts may be of the usual or any ordinary and well-known construction and arrangement and in the specific details thereof form no part of my present invention.

Suitably mounted upon the steering-knuckle 2 is a gear-casing 5, within which the drive-gearing embodying my invention is mounted and arranged. This drive-gearing comprises bevel-gears 6 and 7, arranged to intermesh with each other. The bevel-gear 6 is mounted upon a short shaft 8, suitably journaled in a bearing-block 9, which is arranged within casing 5 and rigidly held therein in any suitable and convenient manner—as, for instance, by a locking-pin 10. The bevel-gear 6 is mounted upon one end of stub-shaft 8, and the other end of said shaft is provided with a rib or tongue 11, adapted to be received within a transverse slot 12, formed in the end of a plug 13, said plug being pivoted or connected to a flexible shaft 14, adapted to lead to the instrument to be driven thereby. The bevel-gear 7 is mounted upon a short shaft 15, suitably journaled in a bearing-block 16, mounted within a lateral extension 17 of case 5 and rigidly held or locked therein by means of a pin 18. Upon the end of shaft 15, which extends through the lateral extension 17 of the casing, is mounted a pinion 19 and held thereon by means of a nut 20. The case 5 is provided with laterally-extending feet 21, adapted to be bolted or otherwise secured to the steering-knuckle 2, whereby such casing will rock or swing with the rocking or swinging movements of the knuckle.

Mounted upon or suitably secured to or otherwise connected to rotate with the wheel 1 is a gear-wheel 22, with which the pinion 19 is in constant mesh, so that whenever the wheel 1 rotates the rotation thereof is imparted through the gears 22 and 19 to shaft 15, and hence through the intermeshing bevel-gears 7 and 6 to shaft 8, and hence also through the connection of shaft 8 with the flexible shaft 14 imparting rotative movement to said shaft 14, and by mounting the drive-gear case 5 upon the steering-knuckle 2 the operation of the drive-gear within casing 5 is not disturbed during the rocking or swinging movements of the steering-knuckle in steering the motor-car or other vehicle.

I will now describe the construction and arrangement embodying the principles of my invention for preventing the rocking movement of the gear-casing during the rocking or swinging movements of the steering-knuckle from twisting or bending the shaft 14. In practice, though, and in this respect I do not desire to be limited or restricted, the shaft 14 is inclosed in a flexible sheathing 23. Upon the end of the flexible sheathing 23 is mounted a hollow cylindrical plug 24, longitudinally through which extends the stem of plug 13, the plug 24 forming a bearing within which said plug 13 rotates. The plug 24 is arranged to extend through a sleeve 25, adapted to be received and to be removably clamped or otherwise secured within casing 5. As a convenient means for removably clamping or securing the bearing-sleeve 25, but to which my invention is not to be limited or restricted, I have shown the casing provided with a chambered enlargement 26, within which is received a plug 27, the peripheral surface of which is adapted to project slightly through the chamber of the extension and into the chamber of casing 5 sufficiently to bear against the exterior surface of sleeve 25. The clamping-plug 27 may be adjusted into and out of bearing contact with sleeve 25 in any suitable and convenient manner—as, for instance, by means of a screw-plug 28. From this description it will be seen that the bearing-sleeve 25 is clamped or secured to rock or swing with casing 5, but by reason of the bearing-plug 24 being journaled to revolve within bearing-sleeve 25 the rocking or swinging movement of sleeve 5 is not transmitted to the plug 24, and hence since said plug is rigidly secured to the sheathing 23 said sheathing remains stationary during the rocking or swinging movement of the casing, and consequently the danger of twisting or bending the sheathing or the flexible shaft 14 during the steering movement of the vehicle is avoided, thereby avoiding wear upon the sheathing and also avoiding the danger of impairing the efficiency of the measuring instrument through the rocking or bending of the shaft 14, through which such instrument is operated.

In leading the shaft 14 and its sheathing 23 from the gear-casing 5 toward the instrument on the body of the vehicle or automobile it is usually necessary to deflect or bend such shaft and sheathing in order to secure the proper direction of lead thereof. This bend or deflection, however, is permanent and when once fixed is not varied from. In order to properly support the shaft and its sheathing and to direct this permanent deflection or bend therein at a point adjacent the gear-casing, I propose to employ a holder or guide-bracket therefor. This holding or guiding bracket is indicated at 29 and is clamped by means of clamp-ears 30 upon the exterior surface of the portion of bearing-sleeve 24 which extends outside of casing 5 or of sleeve 25, as clearly shown in Figs. 1 and 3. This guiding-bracket 29 is arranged to partially inclose the sheathing 23 and is set to the desired course or bend to properly direct the curvature or bend in the sheathing and shaft, said bracket at its upper end embracing the sheathing, as indicated at 31. In this manner the flexible shaft 14 and its inclosing sheathing 23 are efficiently supported and maintained in position and in the desired extent or degree of lateral deflection to secure the proper direction of lead thereof from the drive-gearing to the instrument to be operated. If desired and in order to efficiently brace and support the shaft 15 in the lateral extension 17 of casing 5, said shaft in addition to its bearing within bearing block or plug 16 may have its inner end 32 extended into a bearing formed to receive the same in the bore of a lug or boss 33, formed within casing 5.

It is obvious that since the intermeshing relation of gears 6 and 7 is permanent the shafts 8 and 15 may be journaled or supported in any desired arrangement of permanent bearings, and while I have shown the bearing plugs or blocks 9 and 16 therefor as arranged, respectively, in casing 5 and the lateral extension 17 thereof permanently locked or held in place by the locking-pins 10 and 18 I do not desire to be limited or restricted to such arrangement since, said bearing-blocks may be otherwise permanently mounted or arranged to secure the same results.

The bearing-sleeve 24 may be held in place within bearing-sleeve 25 in any convenient manner. I have shown a simple arrangement to which, however, my invention is not to be limited or restricted; wherein I employ a disk or washer 34, carried by the sleeve 24 and serving to hold sleeve 25 against a shoulder 35 upon the other end of sleeve 24. By removing the screw 28, thereby permitting the withdrawal of locking-plug 27, the sleeve 25, and with it the sleeve 24 and plug 13, may be readily removed from the casing 5, thereby detaching the shaft 14 from shaft 8. These parts may again be assembled by simply inserting the sleeve within the casing 5 with the plug 13 held in such position as to enable the tongue 11 to enter the slot 12 in the end of such plug 13. Then by turning up on screw 28 the sleeve 25 is rigidly clamped or held in place.

From the foregoing description it will be seen that I provide an exceedingly simple and efficient construction of drive-gearing for automobile speed-indicating mechanism wherein the instrument is driven through intermeshing gears, one of which is connected to rotate with a wheel of the vehicle, and that such gearing relation is not disturbed by the rocking or swinging movements of the wheel to effect the desired steering of the vehicle. It will also be seen that the drive-gear casing is so mounted as to permit the rocking or swinging movements of the steering-knuckle without transmitting such rocking or swinging movements to the shaft which transmits the motion from the drive-gearing to the instrument or without imparting such swinging or rocking movement to the sheathing which incloses said shaft. In other words, the drive-gear casing rocks or swings relatively to the sheathing or casing of the transmitting-shaft and merely imparts axial rotative movement to said shaft, but without bending or deflecting such shaft. It will also be seen that the bevel-gears of the drive-gearing are maintained in constant mesh with each other and are respectively mounted upon shafts arranged at right angles to each other and maintained permanently and fixedly in such relation while at the same time affording means which are simple for readily detaching the transmitting-shaft from such drive-gearing. It will also be seen that the drive-gearing is inclosed within the casing 5, thereby efficiently excluding any dust or dirt which might otherwise rapidly wear out such gearing.

Having now set forth the object and nature of my invention and a construction embodying the principles thereof, I desire it to be understood that many variations therefrom and changes in the details of construction thereof might readily occur to persons skilled in the art and still fall within the spirit and scope of my invention. I do not desire, therefore, to be limited or restricted to such details of construction and arrangement.

What I claim as new and useful, and of my own invention, and desire to secure by Letters Patent, is—

1. In a drive-gearing for automobile speed-indicating mechanism, a casing, drive-gearing arranged within such casing, transmitting-gearing operated by said drive-gearing, and means whereby said casing may rock or swing without rocking or swinging said transmitting-gear.

2. In an apparatus of the class described a casing, drive-gearing arranged therein, a transmitting-shaft, detachable connections between said shaft and drive-gearing, and means whereby said casing may rock or swing without bending or deflecting said shaft.

3. In an apparatus of the class described, a casing, drive-gearing arranged therein, a transmitting-shaft, detachably connected to said gearing, a bearing-sleeve within which said shaft is journaled to rotate, and means for detachably clamping said sleeve within said casing.

4. In an apparatus of the class described, a casing having a lateral extension, shafts respectively journaled within said casing and extension and carrying intermeshing bevel-gears, a transmitting-shaft adapted to be connected to one of said shafts, a drive-gear mounted upon the other of said shafts, and means whereby said casing is permitted to rock or swing axially without bending or deflecting said transmitting-shaft.

5. In an apparatus of the class described a casing, shafts arranged therein and carrying intermeshing gears, means for driving one of said shafts, a transmitting-shaft, connections between said transmitting-shaft and the other of said first-mentioned shafts, a sheathing for said transmitting-shaft and means whereby said casing is permitted to rock or swing axially relative to said sheathing.

6. In an apparatus of the class described a casing, shafts journaled therein and carrying intermeshing gears, means for driving one of said shafts, a transmitting-shaft arranged to be driven by the other of said first-mentioned shafts, a cylindrical sleeve within which said transmitting-shaft is journaled, a bearing-sleeve within which said cylindrical sleeve is mounted, and means for clamping said bearing-sleeve within said casing.

7. In an apparatus of the class described a casing, having a lateral extension, bearing-blocks rigidly mounted respectively in said casing and extension, shafts journaled in said bearing-blocks and carrying intermeshing gears, a drive-gear for one of said shafts, a transmitting-shaft having detachable connections with the other of said first-mentioned shafts, a sheathing for said transmitting-shaft and means for permitting said casing to rock or swing axially without bending or deflecting said sheathing.

8. In an apparatus of the class described, a casing, drive-gearing arranged therein, means for driving said gearing, a transmitting-shaft driven by said gearing, a sheathing for said shaft, a curved support for said sheathing and means whereby said casing is permitted axial rotative movement relative to said sheathing and its support.

9. The combination with a wheel having a gear, a pivotally-mounted steering-knuckle upon which said wheel is journaled to rotate, drive-gearing mounted upon said steering-knuckle and arranged to be driven by the gear on said wheel, a transmitting-shaft driven by said drive-gearing, and connections between said transmitting-shaft and said drive-gearing, whereby said drive-gearing may partake of the rocking or swinging movement of the steering-knuckle without bending or twisting said transmitting-shaft.

10. The combination with a wheel having a gear, a pivotally-mounted steering-knuckle upon which said shaft is journaled to rotate, drive-gearing mounted upon said steering-knuckle and arranged to be driven by the gear on said wheel, a transmitting-shaft arranged to be driven by said drive-gearing, a sheathing for said transmitting-shaft, and connections for permitting said drive-gearing to partake of the rocking or swinging movements of the steering-knuckle without transmitting the same to said sheathing.

11. The combination with a wheel having a gear, a pivotally-mounted steering-knuckle upon which said wheel is journaled, a gear-casing carried by said steering-knuckle, drive-gearing arranged within said casing and adapted to be driven by the gear on said wheel, a transmitting-shaft arranged to be driven by said drive-gearing, a sheathing for said transmitting-shaft, and connections between said sheathing and casing to permit the latter to partake of the rocking or swinging movement of the knuckle without transmitting such movement to said sheathing.

12. The combination with a wheel having a gear, a pivotally-mounted knuckle upon which said wheel is journaled, a casing carried by said knuckle, drive-gearing arranged within said casing, and adapted to be driven by the gear on said wheel, a transmitting-shaft arranged to be driven by said gearing, a sheathing for said transmitting-shaft, a rigid guide-support for said sheathing, and journal connections between said sheathing and casing, whereby said casing is permitted axial movement relatively to said sheathing and its support.

In testimony whereof I have signed my name to this specification, in the presence of two subscribing witnesses, on this 15th day of June, A. D. 1906.

ADDI BENJAMIN CADMAN.

Witnesses:
A. P. WARNER,
CHARLOTTE R. HOPPERSTAD.